United States Patent
Westlind et al.

(10) Patent No.: US 12,479,540 B2
(45) Date of Patent: Nov. 25, 2025

(54) MULTIFUNCTIONAL STAND-UP PADDLEBOARD AND METHODS

(71) Applicant: HC Bros, LLC, Marquette, MI (US)

(72) Inventors: Henry Westlind, Marquette, MI (US); Joe Thiel, Marquette, MI (US)

(*) Notice: Subject to any disclaimer, the term of this patent is extended or adjusted under 35 U.S.C. 154(b) by 477 days.

(21) Appl. No.: 18/136,558

(22) Filed: Apr. 19, 2023

(65) Prior Publication Data

US 2023/0339579 A1      Oct. 26, 2023

Related U.S. Application Data

(60) Provisional application No. 63/333,020, filed on Apr. 20, 2022.

(51) Int. Cl.
*B63B 32/40*     (2020.01)
*B63B 32/10*     (2020.01)
(Continued)

(52) U.S. Cl.
CPC ........... *B63B 32/40* (2020.02); *B63B 32/10* (2020.02); *B63B 32/51* (2020.02); *B63B 32/53* (2020.02);
(Continued)

(58) Field of Classification Search
CPC .................. B63B 32/10; B63B 32/51
See application file for complete search history.

(56) References Cited

U.S. PATENT DOCUMENTS 4,020,782 A * 5/1977 Gleason .................. B63B 32/10
441/74
8,591,274 B2 * 11/2013 Haller ..................... B63B 32/51
114/345
(Continued)

FOREIGN PATENT DOCUMENTS

CN     205675195 U  * 11/2016  ............. B63B 32/10
CN     107933845 A  *  4/2018  ............. B63B 32/10
(Continued)

OTHER PUBLICATIONS

Air-Buddy portable dive compressor. Floating, battery-powered surface-supplied air compressor (SNUBA system) that supplies breathing air via hose. Published at least as early as 2016.
(Continued)

*Primary Examiner* — Joseph W Sanderson
(74) *Attorney, Agent, or Firm* — Device Patent LLC

(57) ABSTRACT

Disclosed herein is a multifunctional stand-up paddleboard (MFSUP) comprising a paddleboard, a paddle, and a drive unit. At the stem of the paddleboard is a docking port configured to receive the drive unit that propels the paddleboard. In some embodiments, the paddleboard comprises a rigid midsection, and an inflatable bow and stem. The inflatable portions are inflated during use and deflated then folded over the midsection during storage. A control paddle having control switches send command signals by Bluetooth to the drive unit to control the velocity of propellors. A battery bank is disposed on the midsection and provides power to the drive unit. A solar panel can be included on a superior surface of the paddleboard to supply power to the battery bank. The drive unit is removable from the docking port for propelling a human through a water body. Other features and methods are also disclosed.

21 Claims, 13 Drawing Sheets

(51) Int. Cl.
  *B63B 32/51*     (2020.01)
  *B63B 32/53*     (2020.01)
  *B63H 16/04*     (2006.01)
  *B63H 21/17*     (2006.01)
  *B63H 21/21*     (2006.01)

(52) U.S. Cl.
  CPC ............ *B63H 16/04* (2013.01); *B63H 21/17* (2013.01); *B63H 21/21* (2013.01); *B63H 2021/216* (2013.01)

(56) References Cited

U.S. PATENT DOCUMENTS

| | | | |
|---|---|---|---|
| 8,834,220 B2 | 9/2014 | Haller et al. | |
| 8,851,947 B2 * | 10/2014 | Vlock | B63B 32/66 441/74 |
| 8,951,079 B2 * | 2/2015 | Railey | B63H 21/24 441/74 |
| D785,738 S | 5/2017 | McKellar et al. | |
| 9,663,190 B2 * | 5/2017 | Liu | B63B 32/51 |
| 10,000,266 B1 * | 6/2018 | Terada | B63H 11/08 |
| 10,300,998 B2 * | 5/2019 | Terada | B63H 21/17 |
| 10,421,527 B2 | 9/2019 | McKellar et al. | |
| 10,625,834 B2 * | 4/2020 | MacFarlane | B63H 5/07 |
| 10,850,816 B2 | 12/2020 | Schmidt et al. | |
| 10,926,852 B2 * | 2/2021 | Kramer | B63H 25/06 |
| 10,953,957 B2 * | 3/2021 | Tian | B63B 32/00 |
| 11,034,426 B2 * | 6/2021 | Liang | B63B 32/10 |
| 11,292,557 B2 * | 4/2022 | Dal Pont | B63B 32/51 |
| 11,383,797 B2 * | 7/2022 | Werner | B63B 32/10 |
| 11,459,068 B2 * | 10/2022 | Ostanin | B63B 32/10 |
| 11,535,343 B2 * | 12/2022 | You | B63B 32/51 |
| 11,608,144 B2 * | 3/2023 | Werner | B63B 32/10 |
| 11,673,630 B2 * | 6/2023 | Weisenburger | B63B 32/51 440/111 |
| 11,897,583 B2 * | 2/2024 | Montague | G08C 17/02 |
| 11,939,031 B2 * | 3/2024 | Cohen | B63B 32/77 |
| 2003/0167991 A1 * | 9/2003 | Namanny | B63B 32/10 441/74 |
| 2008/0168937 A1 * | 7/2008 | Ruan | B63B 32/10 114/55.56 |
| 2012/0000409 A1 * | 1/2012 | Railey | B63B 32/40 29/428 |
| 2013/0059489 A1 * | 3/2013 | Vlock | B60L 1/003 440/6 |
| 2013/0137319 A1 * | 5/2013 | Haller | B63B 32/51 441/66 |
| 2016/0355236 A1 * | 12/2016 | Liu | B63B 32/51 |
| 2018/0170502 A1 * | 6/2018 | Terada | G05D 1/0016 |
| 2018/0208279 A1 | 7/2018 | Soren | |
| 2018/0208286 A1 * | 7/2018 | MacFarlane | B63B 32/10 |
| 2019/0168851 A1 * | 6/2019 | Tian | B63B 32/10 |
| 2019/0233076 A1 * | 8/2019 | Aldama | B63B 32/10 |
| 2019/0308696 A1 * | 10/2019 | Tian | B63B 32/00 |
| 2019/0308709 A1 * | 10/2019 | Kramer | B63B 32/10 |
| 2019/0344874 A1 * | 11/2019 | Liang | G08C 17/00 |
| 2020/0346721 A1 * | 11/2020 | Dal Pont | B63H 16/04 |
| 2021/0147040 A1 * | 5/2021 | Ostanin | H01Q 1/27 |
| 2021/0147042 A1 * | 5/2021 | Weisenburger | B63B 32/10 |
| 2021/0206456 A1 * | 7/2021 | Werner | B63B 32/50 |
| 2021/0347442 A1 * | 11/2021 | Montague | B63B 1/28 |
| 2021/0371053 A1 * | 12/2021 | Werner | B63B 32/10 |
| 2022/0024548 A1 * | 1/2022 | Cohen | B63H 21/17 |
| 2022/0212761 A1 * | 7/2022 | You | B63B 7/085 |
| 2023/0074511 A1 * | 3/2023 | Noras | B63H 25/42 |
| 2024/0059375 A1 * | 2/2024 | Werner | H01R 13/631 |
| 2024/0199175 A1 * | 6/2024 | Werntoft | H01M 50/249 |
| 2024/0286725 A1 * | 8/2024 | Kramer | B63B 32/10 |
| 2025/0002121 A1 * | 1/2025 | Reynolds | B63H 21/17 |
| 2025/0100665 A1 * | 3/2025 | Containne | B63H 21/30 |
| 2025/0214694 A1 * | 7/2025 | Montague | B63B 32/10 |

FOREIGN PATENT DOCUMENTS

| | | | | |
|---|---|---|---|---|
| CN | 110239687 A | * | 9/2019 | ............ B63B 32/53 |
| CN | 113734361 A | * | 12/2021 | ............ B63B 32/51 |
| CN | 116374095 A | * | 7/2023 | ............ B63B 32/10 |
| DE | 102018006353 A1 | * | 2/2020 | ............ B63B 32/22 |
| DE | 102023114731 A1 | * | 12/2024 | ............ B63B 32/53 |
| EP | 1977968 A1 | * | 10/2008 | ............ B63B 32/10 |
| FR | 3122859 A1 | * | 11/2022 | ............ B63B 32/51 |
| KR | 20150092856 A | * | 8/2015 | ............ B63B 32/53 |
| KR | 102387698 B1 | * | 4/2022 | ............ B63B 32/40 |
| KR | 20240059234 A | * | 5/2024 | ............ B63H 5/165 |
| WO | WO-2016061274 A1 | * | 4/2016 | ............ B63B 32/10 |
| WO | WO-2019141799 A1 | * | 7/2019 | ......... H01M 50/296 |
| WO | WO-2020254195 A1 | * | 12/2020 | ............ B63B 32/10 |

OTHER PUBLICATIONS

Bixpy Jet (J-2) SUP Motor kit. Detachable electric jet propulsion module and battery pack that mounts into a standard SUP fin box. Published at least as early as 2017.

Crystal SUP-Transparent rigid SUP with underwater viewing through clear hull panels. Published at least as early as 2017.

Origami paddler-a hard-shell SUP/kayak hybrid folding into three sections (briefcase form) for ultra-portable board storage. Published at least as early as 2020.

Sipa boards- an inflatable e-SUP with integrated self-inflating electric motor and Bluetooth-controlled throttle in the paddle handle. Published at least as early as 2015.

* cited by examiner

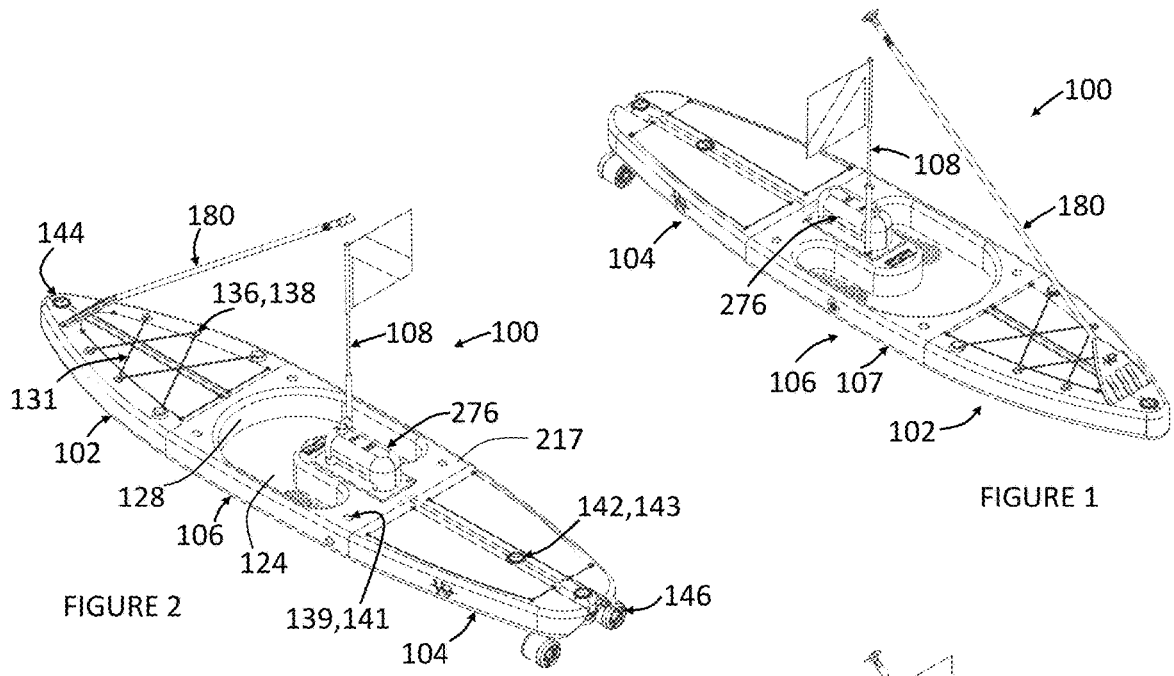
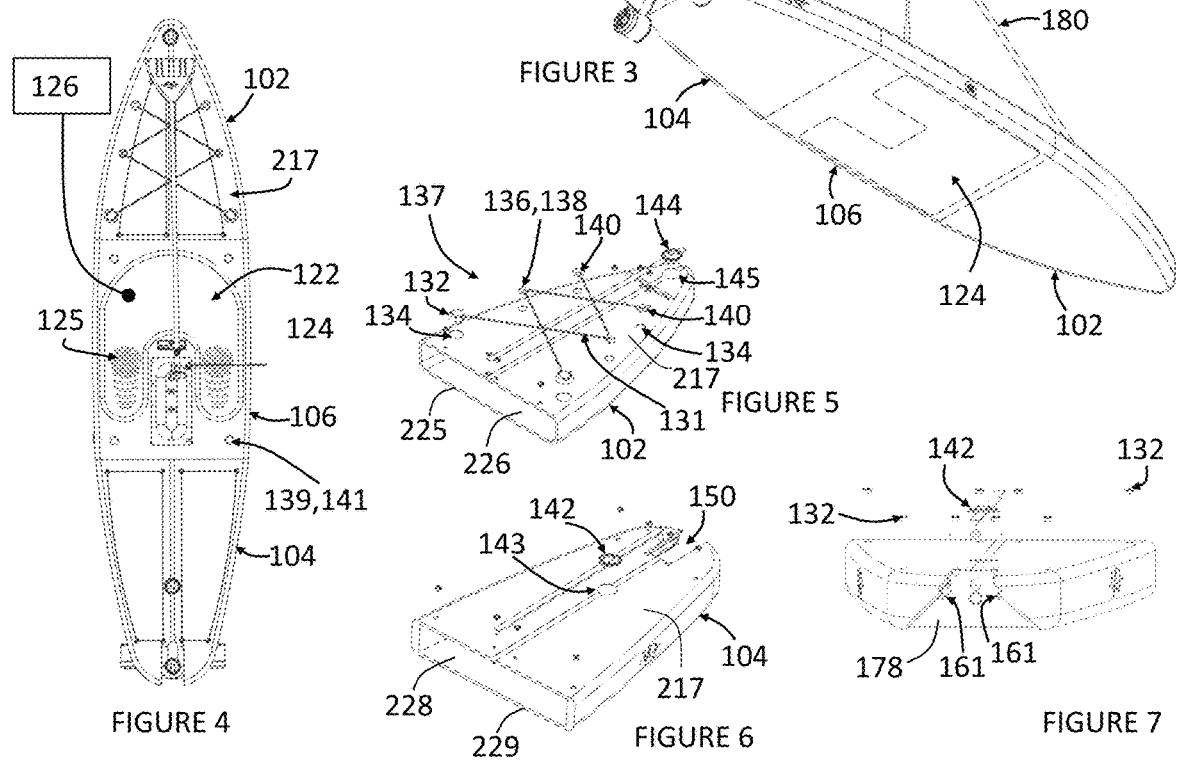

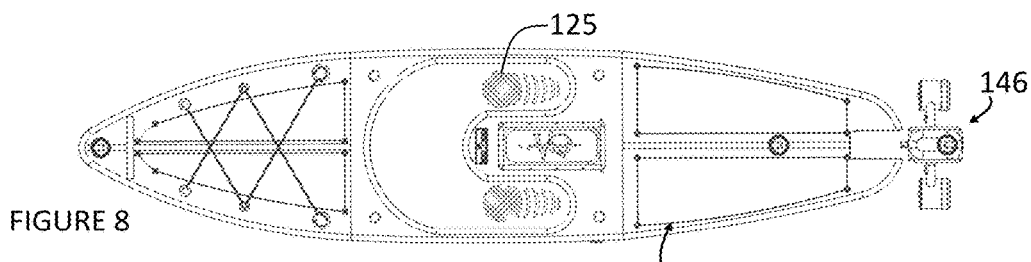
FIGURE 8
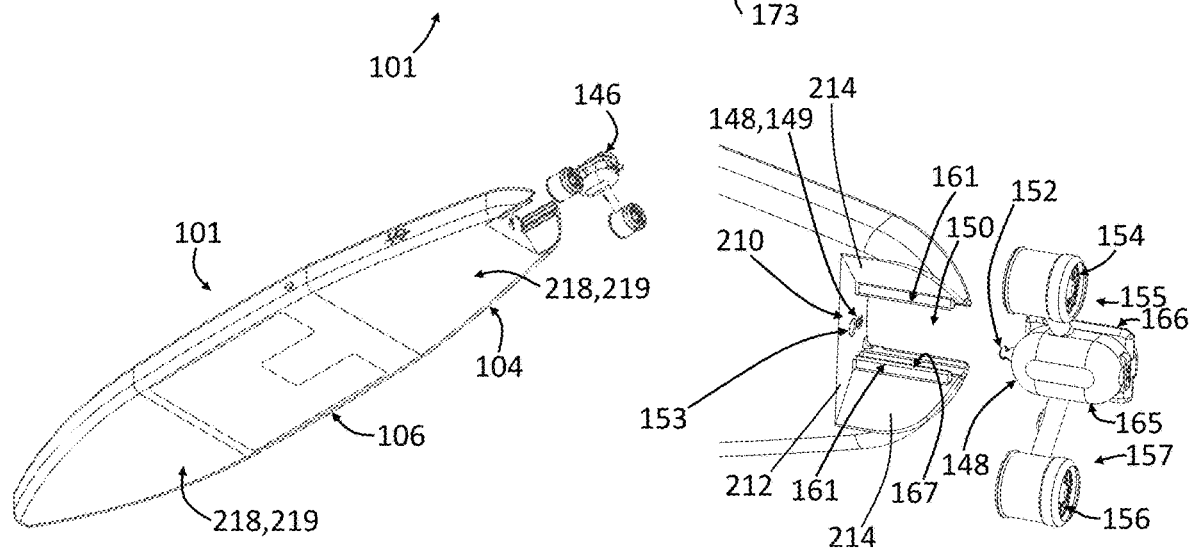
FIGURE 9
FIGURE 10
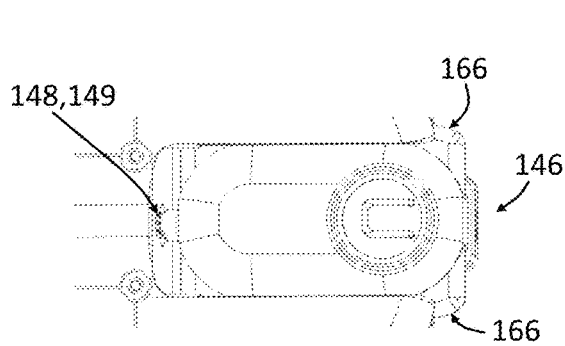
FIGURE 12
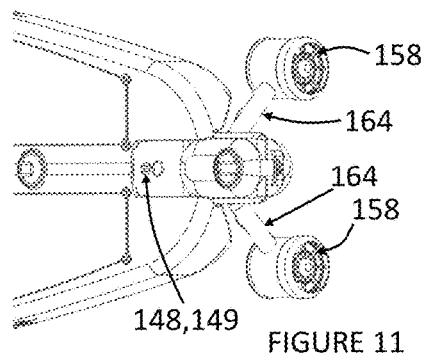
FIGURE 11
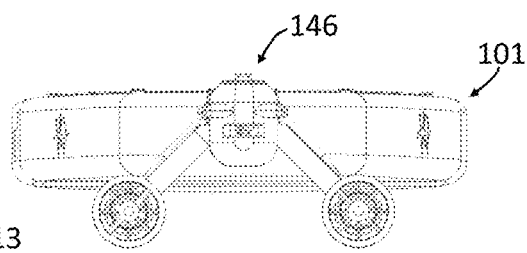
FIGURE 13

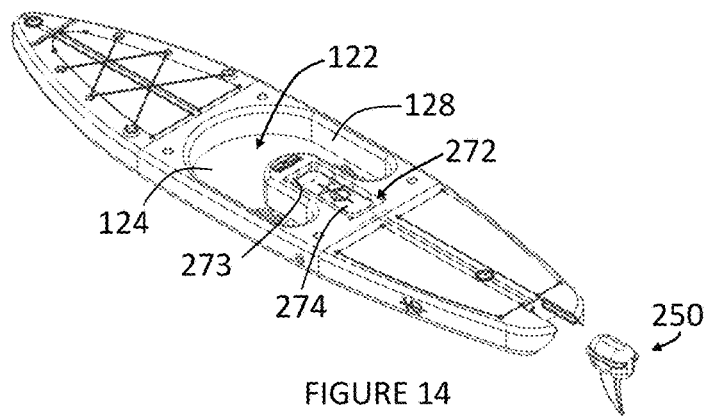
FIGURE 14
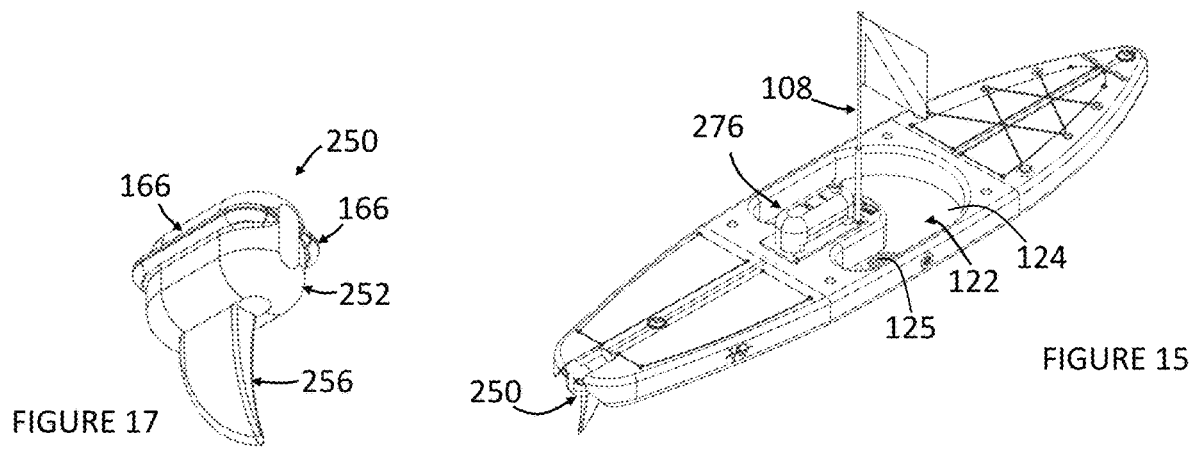
FIGURE 15
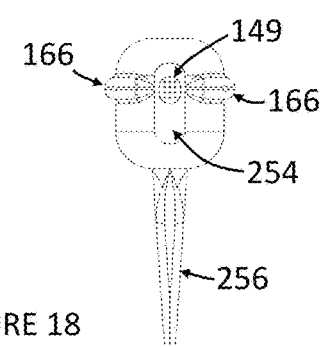
FIGURE 17
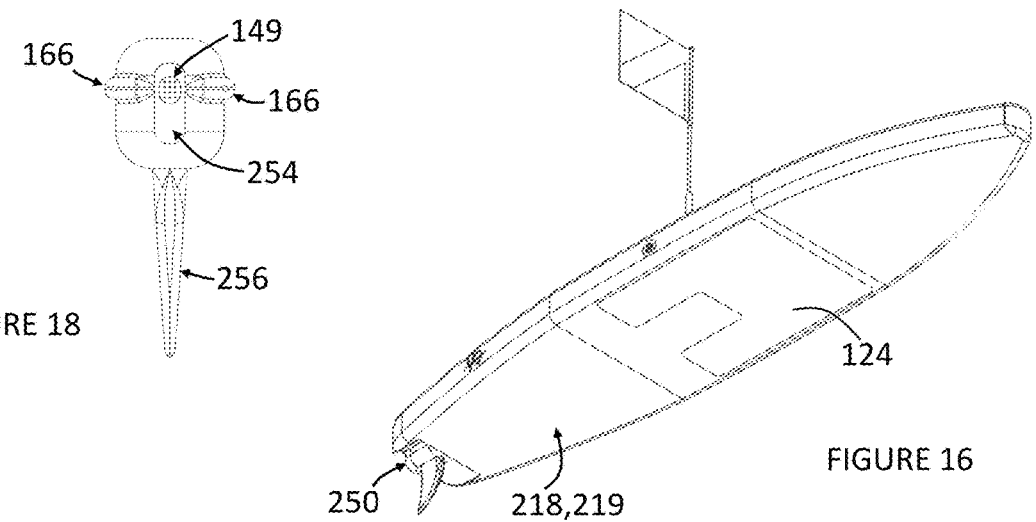
FIGURE 18
FIGURE 16

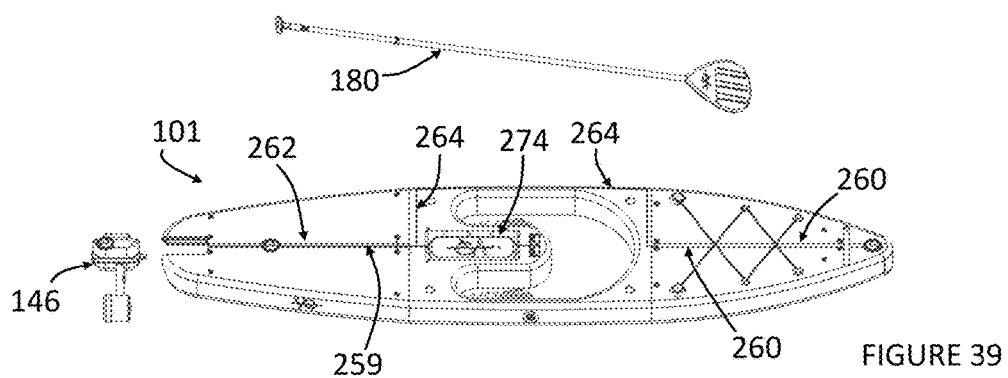
FIGURE 39
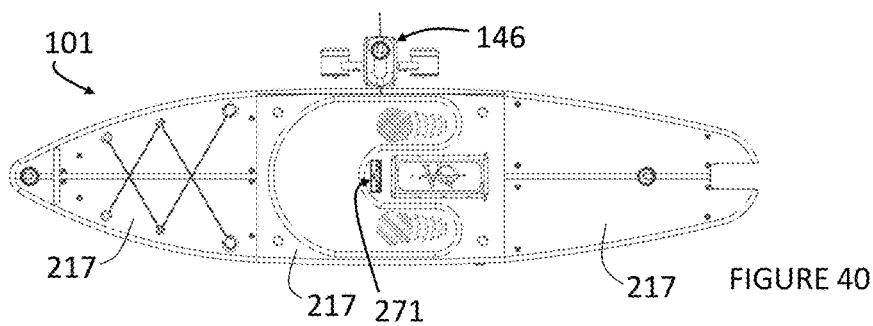
FIGURE 40
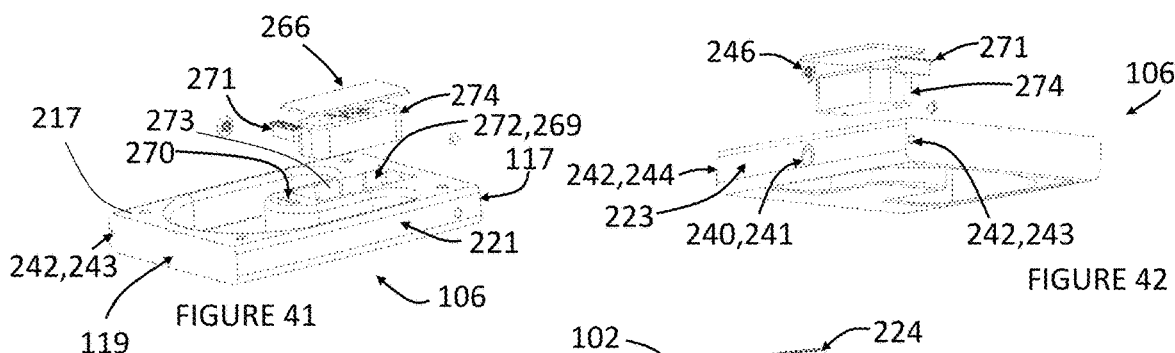
FIGURE 41
FIGURE 42
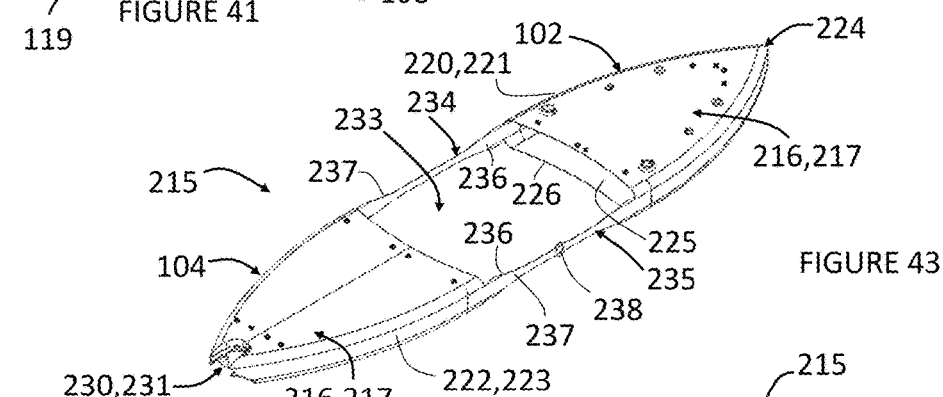
FIGURE 43
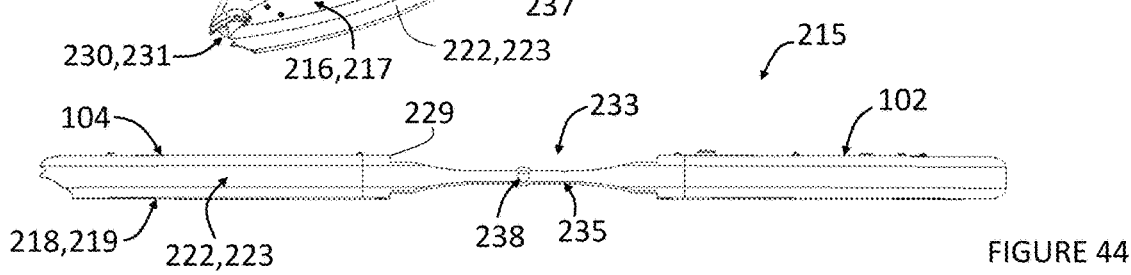
FIGURE 44

| Button | Function | Action |
|---|---|---|
| Button 1 | Power and Motor Control | Hold for 3 seconds to turn on. Hold to engage the motor with a delayed controlled descent when released. Triple-click to engage max power. Power off is a timer set at 5 min. Can control both propellers if Buttons 2 and 3 are not used |
| Button 2 | Propeller Control | Hold for 3 seconds to turn on. Hold to engage the motor with a delayed controlled descent when released. Triple-click to engage max power. Controls both propellers simultaneously |
| Button 3 | Propeller Control | Hold for 3 seconds to turn on. Hold to engage the motor with a delayed controlled descent when released. Triple-click to engage max power. Controls both propellers simultaneously |
| Button 4 | Lockout | Disables Buttons 1, 2 and 3 when engaged. Triple-click to engage predetermined GPS coordinates based off of a smartphone or similar device |

Note: Either Button 2 or Button 3 can be used to turn on the device, and both propellers will turn on simultaneously.

FIGURE 51

MULTIFUNCTIONAL STAND-UP PADDLEBOARD AND METHODS

CROSS REFERENCE TO RELATED APPLICATIONS

This application claims priority to Provisional Patent Application No. 63/333,020 filed Apr. 20, 2022, the entire disclosure of which is hereby incorporated by reference and relied upon.

BACKGROUND OF THE INVENTION

Field of the Invention

The invention relates generally to stand-up paddleboards, and more particularly to powered multifunction stand-up paddleboards.

Description of Related Art

The prior art includes disclosure of generic hard bodied stand-up paddleboards (SUP) and inflatable SUPs. Current SUPs on the market are limited in the features they offer to customers. The prior art is absent of SUPs that have both an electric motor along with being transparent, or that are inflatable while also being solar powered. The lack of features on current SUPs limits the possibilities of what SUP users can experience while adventuring.

SUMMARY OF THE INVENTION

The multifunctional stand-up paddleboards disclosed herein (MFSUP) make the experience of using stand-up paddleboards (SUP) more adventurous and portable. Preferred embodiments of the MFSUPs encompass the creation of a SUP having a transparent floor that also includes a detachable drive motor that can be solar-powered and can alternatively be used as an underwater scuba jet when detached from the MFSUP.

In one form, a MFSUP is inflatable making it easily transportable when deflated and useful to provide adventure and new experiences for users while inflated and on the water.

In one form, a multifunctional stand-up paddleboard (MFSUP) advances technology from three specific fields. These fields include solar, sea scooters (underwater scuba jets), and SUP technology.

In one form, the MFSUP includes a detachable electric sea scooter (drive unit) designed to propel the MFSUP on the water's surface or as a personal propulsion system under the water when detached from the MFSUP.

In one form, the MFSUP comprises a battery pack housed in the drive unit and a battery bank housed in a compartment in the MFSUP.

In one form, the MFSUP is comprised of three sections which includes an inflatable bow, a midsection, and an inflatable stern.

In one form, the inflatable bow and inflatable stern are made of a high-quality, enclosed dual-layer PVC that is inflatable.

In one form, inflator channels (tubes) extending within the midsection of the MFSUP to the inflatable bow and inflatable stern are utilized to inflate the bow section and stern section.

In one form, the inflator channels are embedded within the midsection of the MFSUP leading to an inflator port on the starboard side of the MFSUP. The midsection (known also as the foam section) is made of marine-grade high-density foam.

In one form, the foam section and PVC make for a light yet sturdy hull for the remaining technology that is to be added.

In one form, a D-ring is located on the deck's bow and is used as a tie-down point.

In one form, a configurable ball and notch rail system is used to secure carry-on items to the inflatable bow section.

In one form, the midsection is made of foam and houses several accessory components to assist weight distribution.

In one form, the midsection comprises a standing platform.

In one form, the standing platform is horseshoe shaped that is the footwell where a user stands when the MFSUP is in operation.

In one form, the standing platform is in the form of a platform cavity inset in the midsection and is defined inferiorly by a platform floor and upstanding platform walls.

In one form, the platform floor is in the form of a transparent, magnifying plexiglass allowing the user to see the water environment directly beneath the MFSUP.

In one form, either side of the magnifying plexiglass has raised foot grips to give the user stability while paddling.

In one form, centered in the midsection is a battery cavity for housing a battery bank.

In one form, the battery bank is removable for charging and upgrades.

In one form, a removable lid covers the battery cavity.

In one form, the removable lid has a built-in, hinging, dive flag for safety while swimming near the MFSUP.

In one form, the diving flag has a flag pole that is telescoping.

In one form, a dry storage cavity is located in the midsection in front of the battery pack.

In one form, located in front of the battery bank is a lid-mounted, built-in display module presenting the battery life/charge level of the drive unit battery pack and/or MFSUP battery bank.

In one form, behind the battery pack, on the inflatable stern section is a stern D-ring which can be used as a tie-down point.

In one form, behind the battery pack, yet still within the midsection, is a middle D-ring extending from a middle D-ring receiver.

In one form, the starboard side of the board has a seamless twist-off lid. Inside is the fill valve that can be utilized to carry the deflated MFSUP on land.

In one form, a drive unit conductor from the battery bank extends to the stern of the MFSUP and supplies magnetic charging to the stern-mounted drive unit.

In one form, rare earth magnets secure the drive unit to the inflatable stern of the MFSUP.

In one form, at the stern of the MFSUP is a docking port which houses a magnetic charging port, magnets, and an indent for receiving an inflator nozzle extending from the drive unit.

In one form, an additional D-ring is located on the deck's stern and can be used as a tie-down point.

In one form, the deck of a MFSUP is coated with thin-film flexible solar panel that supplies power to the onboard battery bank in the presence of light.

In one form, a drive unit (sea scooter) is adapted to couple with the MFSUP.

In one form, a GENEINNO S2 sea scooter propulsion device is modified for use to mate with the MFSUP and serve as propulsion.

In one form, modifications are made to the GENEINNO S2 which can include one or more of moving the position of the magnetic docking, adding a D-ring to the drive unit housing, integrating an air compressor, integrating magnets, integrating an inflator/mounting nozzle, integrating a battery pack, and integrating a psi gauge. In preferred embodiments, these components are located in a hydrodynamic plastic housing containing structural supports for all mounting brackets.

In one form, sufficient air pockets within the drive unit are inflated for positive buoyancy.

In one form, a charge mate in the form of a magnetic charging receiving coil and drive loop are embedded in the nose of the sea scooter assembly.

In one form, a charge base in the form of a magnetic charger are located on a dock wall within a docking port of the MFSUP.

In one form, when the drive unit is seated within the docking port, the charge base provides electrical energy through the charge mate to the drive unit.

In one form, a mag mate in the form of a magnetic metal or neodymium disc magnets are positioned on the nose of the drive unit.

In one form, a mag base in the form of a magnetic metal or neodymium disc magnets are positioned on a dock wall within a docking port of the MFSUP.

In one form, when the drive unit is docked in the docking port of the MFSUP, the mag mate aligns with the mag base thereby releasably securing the drive unit within the docking port.

In one form, an inflator nozzle is located on the nose of the drive unit.

In one form, positioned above the charge mate on the drive unit housing is a GO-PRO style mounting.

In one form, a D-ring is disposed on the top of the drive unit housing.

In one form, stationary hydrodynamic bars in the form of a first drive appendage and a second drive appendage attach the sea scooter housing unit to respective propellers.

In one form, a thumb or finger manipulated first throttle trigger is positioned on the first drive appendage, and a second throttle trigger is positioned on the second drive appendage.

In one form, the throttle triggers on the respective drive appendages control speed and direction.

In one form, integrated into the drive unit are one or more of: a smart lithium-ion battery, electric motors, a manual control board, an SSC Bluetooth link, and an air compressor.

In one form, the drive unit provides sufficient structural support to support the weight of the MFSUP.

In one form, one or the other or both of throttle triggers on the handlebars and control switches on the paddle handle can manipulate the velocity of the propellers.

In one form, the paddle for the MFSUP comprises a paddle handle. The paddle handle comprises 2-4 control switches to control throttle of the drive unit propellers.

In one form, the paddle handle comprises an SSC BT (Bluetooth) link with a power source seated within the paddle handle.

In one form, the power source is in the form of a paddle battery seated within a battery housing in the paddle handle.

In one form, replaceable batteries are located under a lid on the top grip section of the paddle handle.

In one form, the MFSUP comprises two leashes. The first leash (MFSUP leash) is used to connect the user to a middle D-ring or stern D-ring. For example, the first leash can be a 7 ft. coil leash with a clip and ankle strap on either end. The second leash (drive unit leash) can be used to connect the MFSUP to the sea scooter assembly. The second leash comprises a retractable mechanical mechanism locking switch. A short line connected to the retractable mechanical mechanism with a carabineer on the other end can be clipped to any D-ring on the MFSUP. The mechanical mechanism includes a 30 ft retractable line with a carabineer on the end that clips to the drive unit.

In one form, the mechanical mechanism is wrapped in a floatation aid.

In one form, the paddleboard assembly has an inflatable stern and an inflatable bow that when deflated can be folded around a rigid midsection thus transitioning between a folded and unfolded configuration.

In one form, an elastic cord extending around hooks seated on the superior surface of an inflatable skirt of the MFSUP, are used to secure the deflated MFSUP in a folded configuration.

In one form, a method of using a MFSUP includes the steps of: the Halkey Robert valve mate extending from a drive unit is secured to the lateral inflator port (fill valve). The control paddle is clipped in Velcro straps on the starboard side of the MFSUP. Placing the user's hands on the handlebars of the drive unit and lifting off the ground, the user carries the entire assembly to a new location. Once at the desired location, the user removes the Velcro straps, lays the board flat, and removes the control paddle. The user then activates an inflation switch and the built-in air pump on the drive unit is activated to inflate the MFSUP to a predetermined pressure. A gauge built into the drive unit can be used to determine full inflation. The user then aligns the mounting tongues on the drive unit with the mounting grooves of the base rails and slides the drive unit toward the dock wall until the drive unit is secured in position by the magnetic force between the magnet mate on the drive unit and the magnet base at the dock wall. Then an optional MFSUP ankle leash is strapped in and a communication link is established between the Bluetooth on the control paddle and Bluetooth in the drive unit.

In one form, a method of using a MFSUP includes the following steps. Launching the MFSUP onto a body of water. Manually propelling the MFSUP by paddling freely or using control switches on the paddle handle of the control paddle to activate the propeller on the drive unit to propel the paddleboard forward. Once at a desired location, the user secures the control paddle to the MFSUP using the elastic cords on the superior surfaces of the inflatable section or clipping in paddle straps located on the midsection. The user then raises the dive flag and enters the body of water. Distracting the drive unit away from the magnets on the dock wall, the user removes the drive unit from the stern of the MFSUP. Grasping the respective handlebars on the drive unit, the user then depresses the throttle triggers thereby activating the propellers to propel the drive unit and user forward on the surface or below the water surface.

In one form, a MFSUP gives users new and unique ways to explore the water and is useable for all recreation levels, whether it be thrill-seekers, or people looking to take a relaxing float on the water. With its portable design, the MFSUP can be brought anywhere, opening up the possibilities of outdoor adventure on the water anywhere one ventures.

BRIEF DESCRIPTION OF THE SEVERAL VIEWS OF THE DRAWINGS

These and other features and advantages of the present invention will become more readily appreciated when considered in connection with the following detailed description and appended drawings, wherein each drawing is according to one or more embodiments shown and described herein, and wherein:

FIG. 1 depicts a starboard top perspective view of a multifunctional stand-up paddle board (MFSUP).

FIG. 2 depicts a port top perspective view of the MFSUP of FIG. 1.

FIG. 3 depicts a starboard bottom perspective view of the MFSUP of FIG. 1.

FIG. 4 depicts a top (superior) view of the MFSUP of FIG. 1.

FIG. 5 depicts a top perspective of a partially exploded view of an inflatable bow (straps removed) of the MFSUP of FIG. 1.

FIG. 6 depicts a top perspective of a partially exploded view of an inflatable stern (straps removed) of the MFSUP of FIG. 1.

FIG. 7 depicts the inflatable stern of FIG. 6 from another angle.

FIG. 8 depicts a top view of a drive unit being aligned to mate in a docking port of a paddleboard assembly.

FIG. 9 depicts a bottom perspective view of the paddleboard assembly of FIG. 8.

FIG. 10 depicts a close-up view of the docking port and drive unit of the paddle board assembly in FIG. 8.

FIG. 11 depicts a partial top perspective view showing a drive unit partially engaged within a docking port.

FIG. 12 depicts a top partial view of the drive unit fully docked within a drive port of a paddleboard assembly.

FIG. 13 depicts a posterior view of a MFSUP with drive unit fully docked.

FIG. 14 depicts a top perspective view of a paddleboard assembly with a fin insert aligned with a docking port in preparation for docking. The removable lid is removed.

FIG. 15 depicts a top perspective view of the paddleboard assembly of FIG. 14 with fin insert fully docked.

FIG. 16 depicts a bottom perspective view of the paddleboard assembly of FIG. 15.

FIG. 17 depicts a bottom perspective view of a fin insert.

FIG. 18 depicts a front view of the fin insert of FIG. 17.

FIG. 39 depicts a top perspective view of a MFSUP and electrical conductors utilized within it.

FIG. 40 depicts a top view of a MFSUP with drive unit coupled to the lateral inflator port for inflating or deflating the inflatable bow and inflatable stern.

FIG. 41 depicts an exploded top perspective view of a midsection.

FIG. 42 depicts an exploded bottom perspective view of a midsection.

FIG. 43 depicts a top perspective view of an inflatable skirt.

FIG. 44 depicts a side view of the inflatable skirt of FIG. 43.

FIG. 51 depicts a chart describing various actions that can be initiated by button presses on a control paddle;

DETAILED DESCRIPTION OF SELECTED EMBODIMENTS OF THE INVENTION

Figure 19:
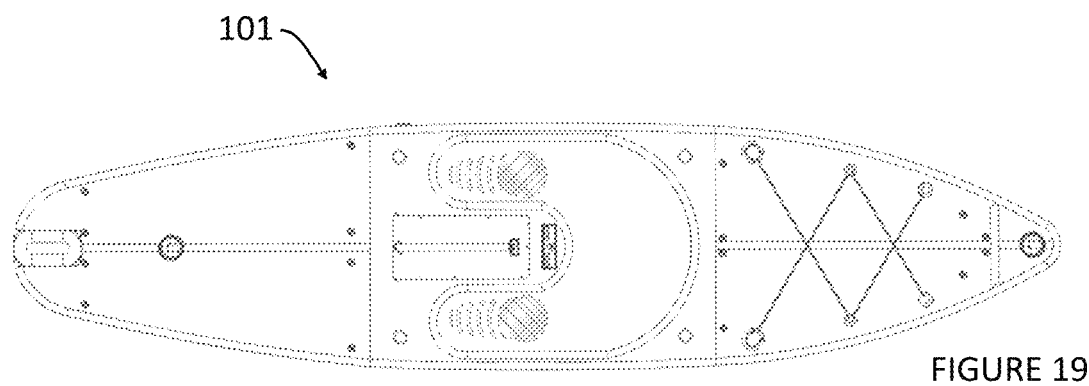
FIG. 19 depicts a top view of a paddleboard assembly without solar panels.

Select embodiments of the invention will now be described with reference to the Figures. Like numerals indicate like or corresponding elements throughout the several views. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes, or which is essential to practicing the invention described herein.

FIGS. 1-4 depict various views a multifunctional stand-up paddle board 100 (MFSUP). The MFSUP comprises three main parts including a paddleboard assembly 101, a drive unit 146 that is removable in preferred embodiments, and a control paddle 180. The paddleboard assembly 101 in preferred embodiments comprises three portions that includes an inflatable bow 102, an inflatable stern 104, and a midsection 106. When inflated the paddleboard assembly is in an inflated state, whereas, when the bow and stern are deflated the paddleboard assembly is considered to be in a deflated state. Portions of the paddleboard assembly may include an outer coating for piercing protection, to add color, and/or for branding on outer surfaces of the inflatable bow, inflatable stern, or midsection of the paddleboard assembly. The inflatable bow and inflatable stern provide the shape of the MFSUP. In preferred embodiments, these sections are manufactured of a dual-layer PVC. When deflated, the inflatable bow and inflatable stern fold face down on top of the midsection section to make the deflated paddleboard assembly be both light and have a small footprint to ease transport on land.

The inflatable bow 102 and inflatable stern 104 in preferred embodiments are joined in an inflatable skirt 215 which again can be made from PVC or similar materials. As noted in FIGS. 43 and 44, the inflatable skirt 215 has a central receiver port 233 in which the midsection 106 fits when the inflatable bow 102 and inflatable stern 104 are stretched then released over the midsection. Both the inflatable bow and inflatable stern comprise a superior wall 216 with a superior surface 217 thereon opposed by an inferior wall 218 with an inferior surface 219 thereon. A port wall 220 joins the superior wall and inferior wall on the port side, whereas a starboard wall 222 joins the superior wall and inferior wall on the starboard side. Externally, the port wall 220 has a port surface 221 thereon, and the starboard wall 222 has a starboard surface 223 thereon. At the bow end, these surfaces converge at a bow junction 224. The inside of the aforementioned walls at the bow are defined by inner bow surface 225 and terminate at rear bow surface 226 which faces towards the stern. Similarly, the inside of the aforementioned walls at the stern are defined by inner stern surface 228 and terminate at front stern surface 229 which faces towards the bow (FIGS. 5,6). A port strap 234 travels between the port wall 220 of the inflatable bow 102 and the inflatable stern 104 and a starboard strap 235 travels between the starboard wall 222 of the inflatable bow and the inflatable stern 104. Facing outwards on these straps is an outer strap surface 237, whereas facing inwards on these straps is an inner strap surface 236.

As noted earlier, the inflatable bow 102 comprises an inner bow surface 225 (FIG. 43) and the inflatable stern 104 comprises and inner stern surface 228. When midsection 106 is seated in central receiver port 233, a portion of the inner bow surface and the inner stern surface are stretched to encircle the midsection 106 around the midsection bow face 119 and midsection stern face 117 and sealed with glue or other sealant thereby enclosing these inflatable sections such that they can hold compressed air without leaking. At the stern end of the inflatable skirt 215 is a cut out for the docking port 150. It is here that a rear stern surface 231 defines a U-shaped stern drive cavity 230. Within this stern drive cavity the U-shaped dock walls 210 are sealed to the respective portions of the inflatable skirt 215 assuring the inflatable stern is air tight.

Figure 52:
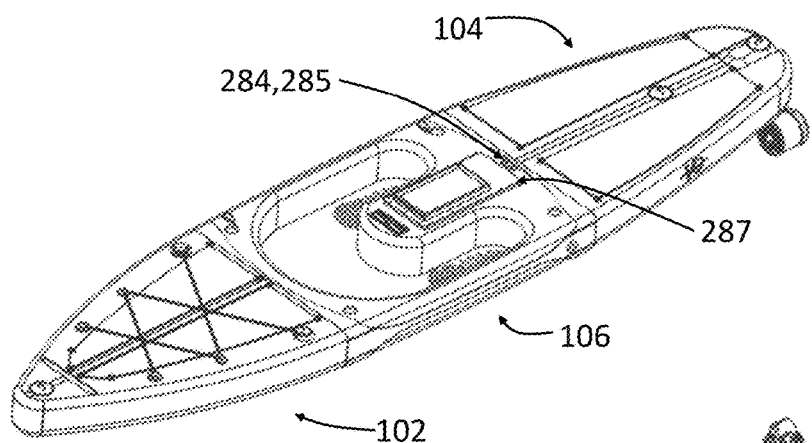
FIG. 52 depicts a top perspective view of a paddleboard assembly.

The midsection 106 of the paddle board assembly in preferred embodiments is manufactured from a high density foam to form a midsection body 107. However, in alternative embodiments the midsection can be of other materials such as a polymer or fiberglass. In this embodiment, the midsection provides a framework for the battery bank 274, battery meter 271, standing platform 122, inflator hole 238, and mid D-ring 284 for securing items such as an ankle leash. Extending through the superior surface 217 of the midsection 106, are one or more support bores 139 defined by a support bore face 141. In preferred embodiments, the support bore face defines a cylindrical bore (although other shapes can be used) extending 50-90% of the midsection thickness. A center-axis of the support bores in some embodiments tilts outward and are otherwise configured to seat the handle of a fishing pole or hold other accessories having an extension that can be held within the bores. In some embodiments, a pair of spaced paddle straps 290 are fixed to the midsection and releasably bind a standard paddleboard paddle or a control paddle 180 on the starboard or port sides. As depicted in FIG. 52, the mid D-ring 284 which can extend from a mid D-ring receiver 285 (located on superior surface 217) is positioned behind the battery cavity.

The standing platform 122 in preferred embodiments is U-shaped and inset into the midsection body 107 extending downward from the midsection superior surface 217 forming a platform cavity 130. Here, the inset standing platform is defined laterally by platform walls 128 and a platform floor 124 that faces upward. The platform floor can be of the same material of the midsection, however, in other embodiments the platform floor comprises a horseshoe-shaped cutout of magnifying 126 or clear plastic set at water level. This allows users to see through the standing platform into the water body and its contents below them while paddleboarding. Each end of the horseshoe shape can comprise foot grips 125.

In some embodiments an inflation nozzle is located at the inflatable bow and at the inflatable stern such that each of these sections can be inflated independently by a pump directly into the specified section. In preferred embodiments however, such as illustrated in FIGS. 41-44, a lateral inflator port 240 opens to a lateral inflator channel 241 through the through the midsection port surface 221, or preferably the midsection starboard surface 223. The lateral inflator channel 241 extends to elongate inflator channel 242 which travels between bow inflator port 243 and stern inflator port 244. This system of channels traveling through the midsection provides for the inflation/deflation of the inflatable bow 102 and inflatable stern 104 through movement of air through the single lateral inflator port 240.

Also noted in FIGS. 41 and 42 is a battery cavity 272 defined by battery wall 273 which defines the sides and bottom of the battery cavity. The battery cavity 272 is inset through the midsection superior surface 217 and has a profile sufficient in size to house a battery bank 274 therein. A battery meter 271 can be mounted near the battery bank such as on top or inset within superior surface 217 within, for example, a battery meter cavity 270, to monitor the battery bank's charge level. In some embodiments, battery cavity 272 is enlarged (containing additional space) and to provide a dry storage cavity 269. The dry storage cavity can be used to store valuables such as a wallet, money, credit card, and/or electronics such as a cell phone.

In preferred embodiments, a removable lid 266 extends over the battery cavity 272 and dry storage cavity 269. A lid locking mechanism will hold the removable lid in place. In preferred embodiments, the lid creates a waterproof seal over the cavities below. In some embodiments, a battery status indicator is integrated into the removable lid for viewing by the user to alert them of the charge level of the adjacent battery bank 274 stored in the battery cavity 272.

Figure 27:
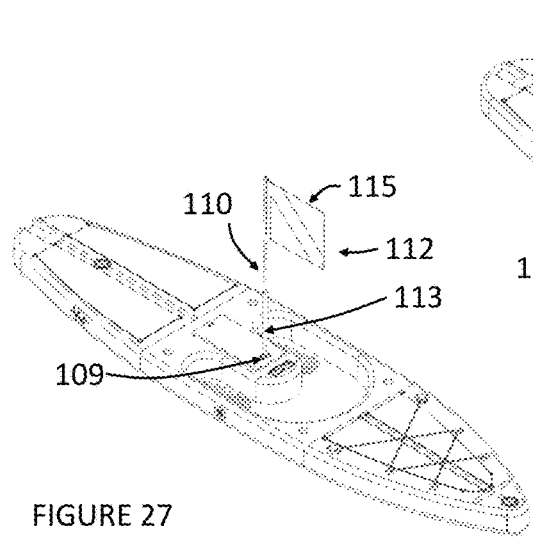
FIG. 27 depicts a top perspective view of a paddleboard assembly with flagpole telescoped to full length and flag deployed.
Figure 26:
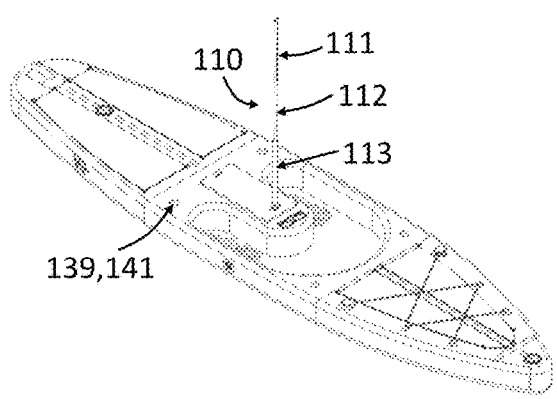
FIG. 26 depicts a top perspective view of a paddleboard assembly with flagpole telescoped to full length.
Figure 28:
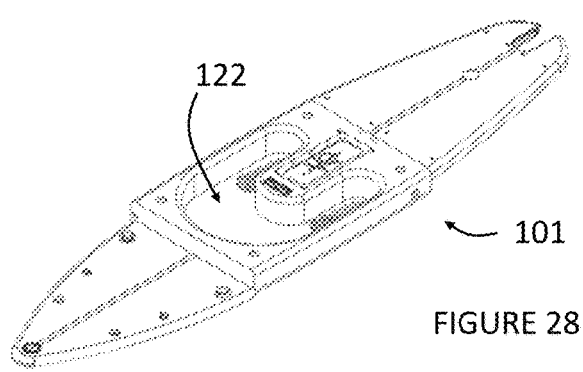
FIG. 28 depicts a top perspective view of a paddleboard assembly with inflatable stern and inflatable port deflated in preparation of folding.
Figure 29:
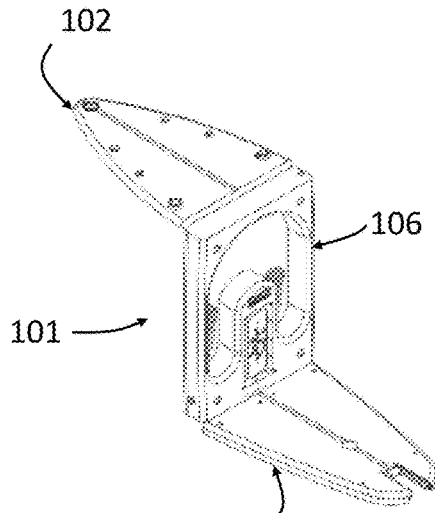
FIG. 29 depicts a top perspective view of a paddleboard assembly with inflatable stern and inflatable port during folding process.
Figure 30:
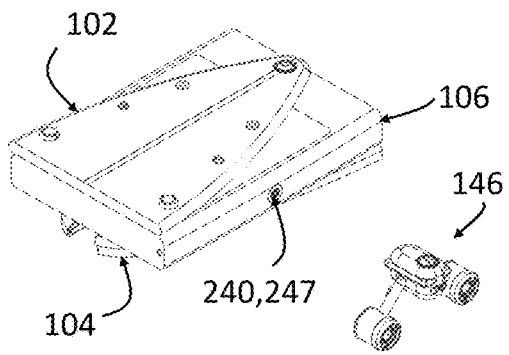
FIG. 30 depicts a perspective view of a paddleboard assembly with inflatable stern and inflatable port fully folded.

Some embodiments include a dive flag attached to the removable lid 266. In some embodiments, the dive flag which can be telescoping, is seated upright in a support collar attached to the removable lid. In other embodiments, such as depicted in FIG. 27, the dive flag is pivotably attached to the removable lid 266 using a pivot 109. Here the pivot is in the form of an L-shaped bracket secured to the removable lid. The dive flag in preferred embodiments is in the form of a flag assembly 108 comprising the flag 114, and a telescoping flag pole 110. The telescoping flagpole comprises a plurality of telescoping pole segments. In this embodiment, that includes a third pole segment 113 coupled to the pivot 109, a second pole segment 112 extending therefrom, and a first pole segment 111 positioned most superiorly. When compressed down (undeployed mode), the second pole segment 112 and the first pole segment 111 are seated within the third pole segment 113. When the multifunctional stand-up paddle board is stopped, such as when a user wishes to go diving, the flag 114 can be used in the upright position (deployed mode) as a visual alert of divers below to other boaters in the area. In an alternative embodiment, the flag can be hidden under a sliding cover 115 in the removable lid 266. Also noted in FIGS. 1 and 2 is a surface air motor 276 that is integrated into the top of the removable lid 266. In alternative embodiments, the surface air motor is secured to the top of removable lid 266. The surface air motor supplies air suitable for breathing to a diver using a diver's umbilical from the air motor. The surface air motor is powered utilizing power from battery bank 274 through an air motor electrical conductor. In addition, the surface air motor can be activated to pump additional air into lateral inflator port 240 to keep the inflatable stern 104 and inflatable bow 102 fully pressurized. In some embodiments, a flag assembly 108 is secured next to the surface air motor 276 wherein they can be used simultaneously.

Figure 53:
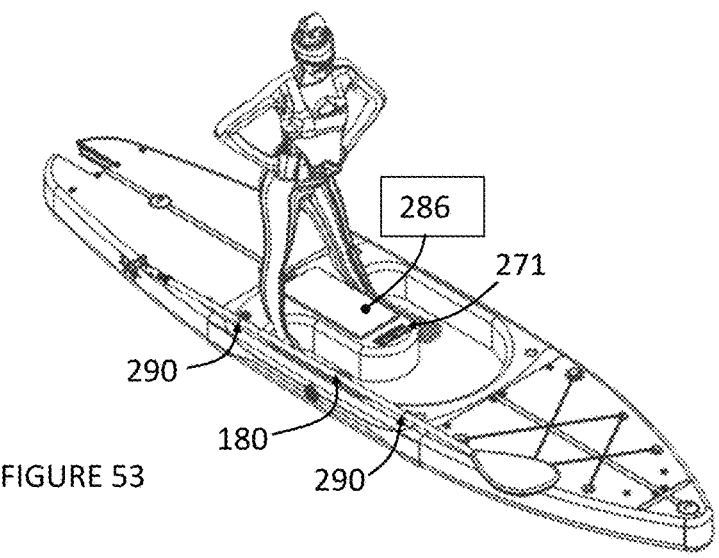
FIG. 53 depicts a top perspective view of a user standing on a paddleboard assembly.
Figure 54:
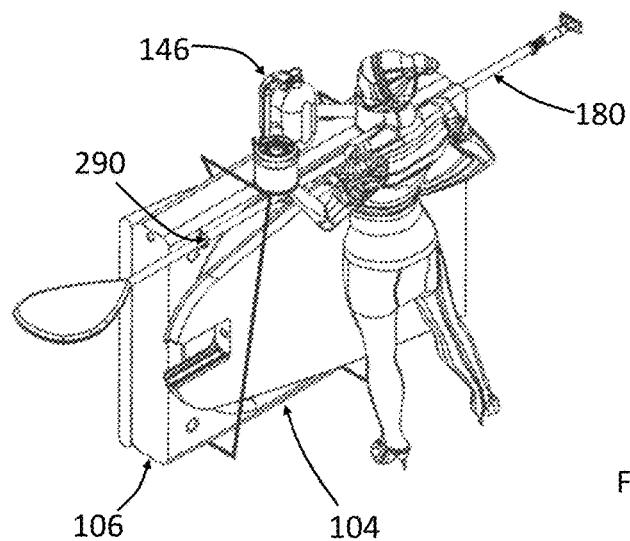
FIG. 54 depicts a top perspective view of a user about to move a MFSUP in a folded configuration.

The removable lid 266 (interchangeable lid) makes possible several additional accessory options aside from the dive flag option and surface air. For example, one option includes integrating restraints for securing a tablet (tablet lid 287), and a tackle box lid 286 having a tackle box integrated into the removable lid as depicted in the alternative in FIG. 53.

Figure 55:
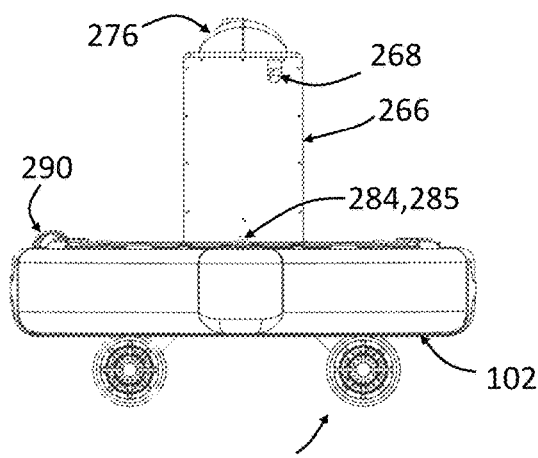
FIG. 55 depicts a bow view of a MFSUP with removable lid partially open.
Figure 56:
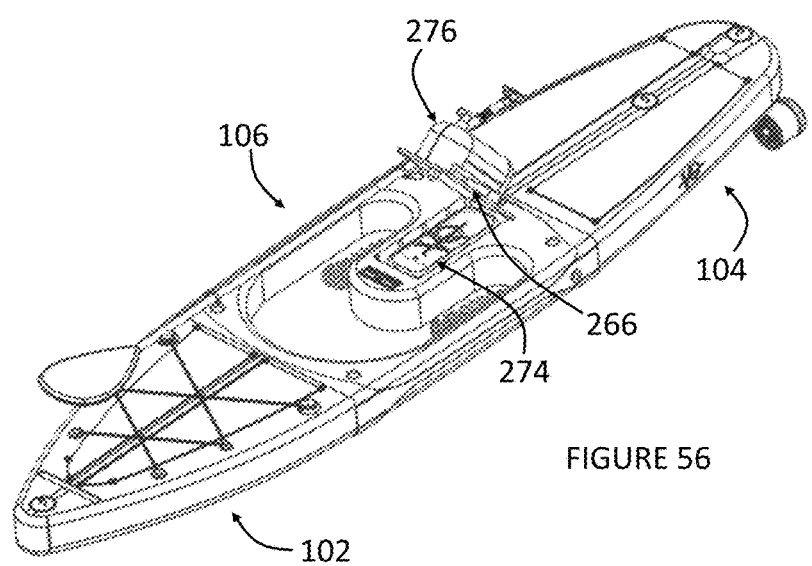
FIG. 56 depicts a top perspective view of a MFSUP.
Figure 57:
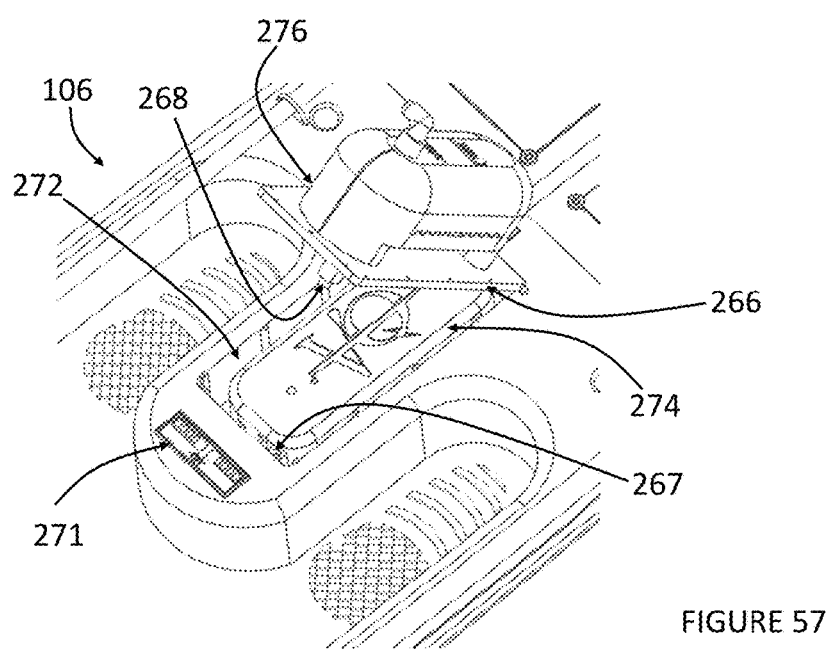
FIG. 57 depicts a partial top perspective view of a battery cavity.

FIGS. 55-57 depict various views of a MFSUP with a surface air motor 276 integrated into the removable lid 266.

In this embodiment, the removable lid is equipped with a surface charger load coupling 268 which is aligned with and electrically connects when the removable lid is closed, with a surface charger supply coupling 267 that carries electrical energy from battery bank 274 to the surface air motor 276. Here the two couplings are male/female, however other types of electrical couplings known in the art can be used.

Figure 35:
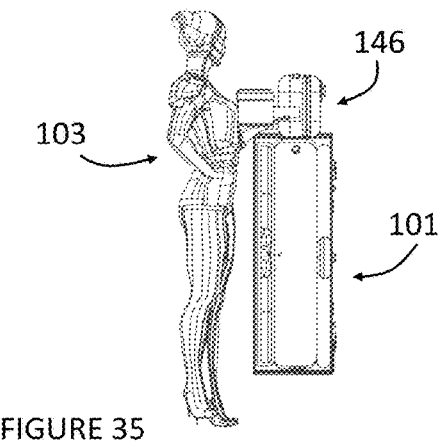
FIG. 35 depicts a side view of a human lifting a paddleboard assembly and drive unit for transportation. The paddleboard assembly is in a folded configuration.
Figure 36:
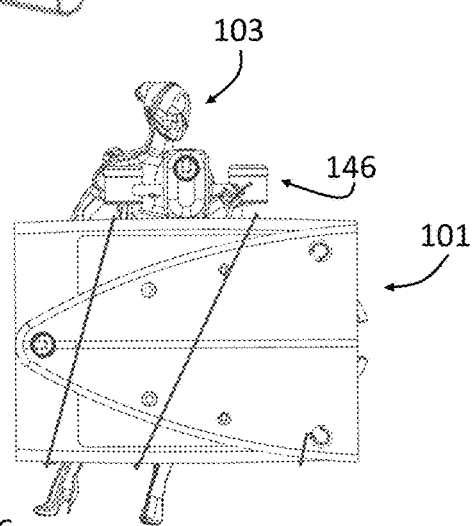
FIG. 36 depicts a front view of the human and paddleboard assembly of FIG. 35.
Figure 38:
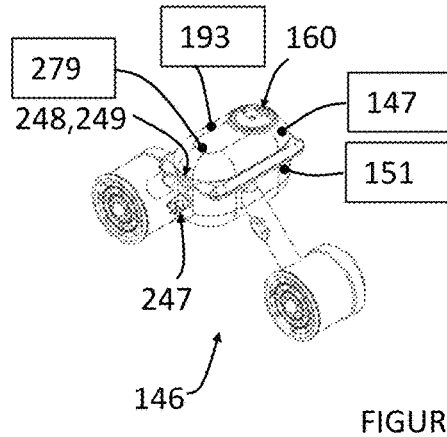
FIG. 38 depicts a top perspective view of a drive unit.
Figure 45:
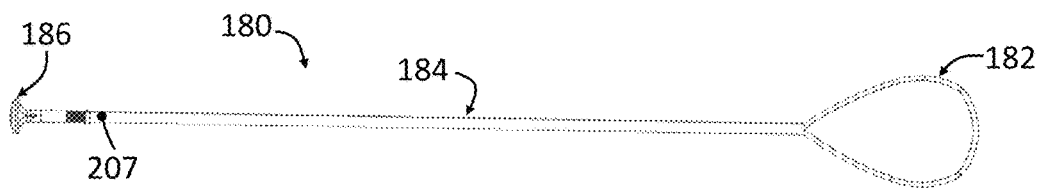
FIG. 45 depicts a bottom view of a control paddle.
Figure 46:
FIG. 46 depicts a side view of the control paddle of FIG. 45.
Figure 47:
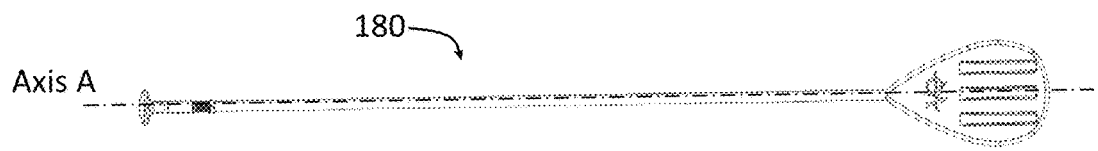
FIG. 47 depicts a top view of the control paddle of FIG. 45.
Figure 48:
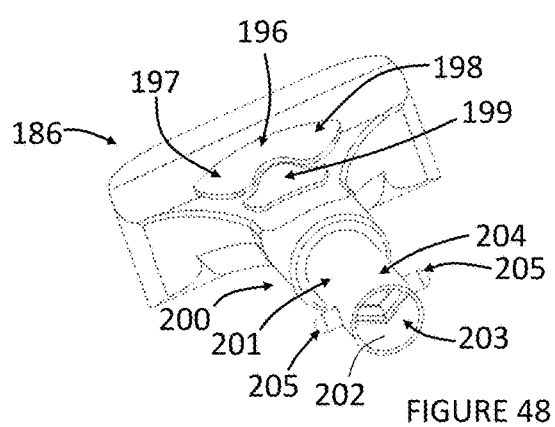
FIG. 48 depicts a bottom perspective view of a paddle handle of the control paddle of FIG. 45.

As noted in FIG. 38, a drive unit 146 for propelling the paddleboard assembly 101 forward can comprise a valve stem depicted here in the form of a Halkey Roberts valve mate 247 which is configured for releasable mating with a Halkey Roberts valve 246 that is coupled to the lateral inflator port 240 of midsection 106 (FIG. 42) by a twisting motion between the bayonet style connectors. When drive unit 146 is mated to midsection 106, an integrated air pump 151 within the drive unit 146 can be activated to inflate or deflate the inflatable bow 102 and inflatable stern 104. In addition, as depicted in FIGS. 35-36, the drive unit can be used to lift and transport the MFSUP across land.

Figure 20:
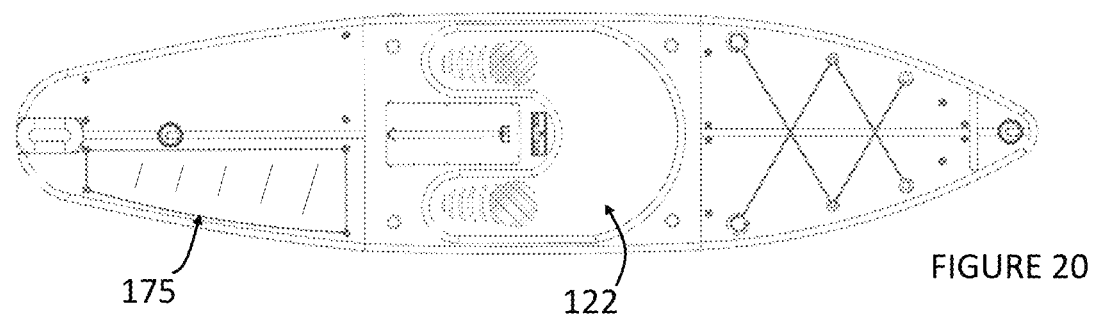
FIG. 20 depicts a top view of a paddleboard assembly with one solar panel installed on the inflatable stern.
Figure 21:
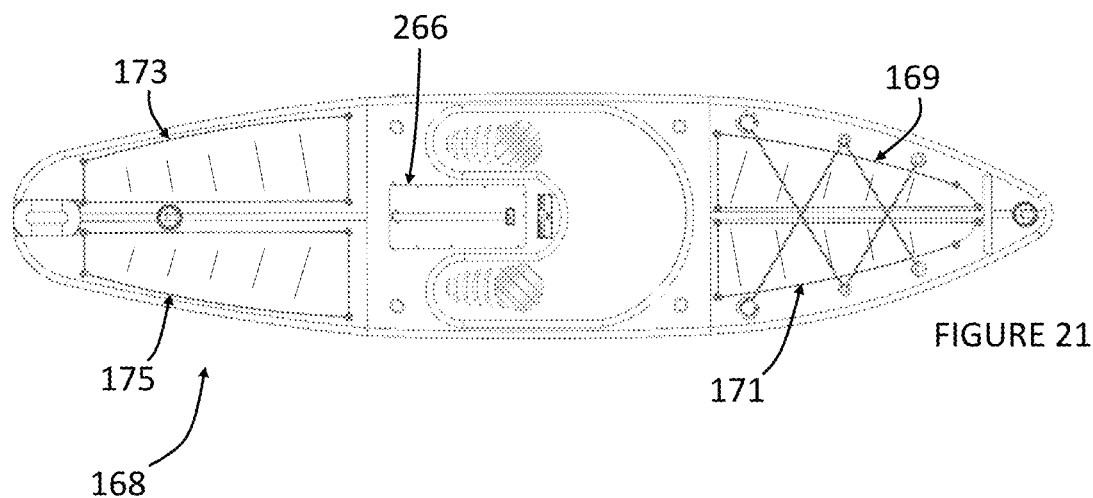
FIG. 21 depicts a top view of a paddleboard assembly with two solar panels installed on the inflatable stern and two on the inflatable bow.
Figure 22:
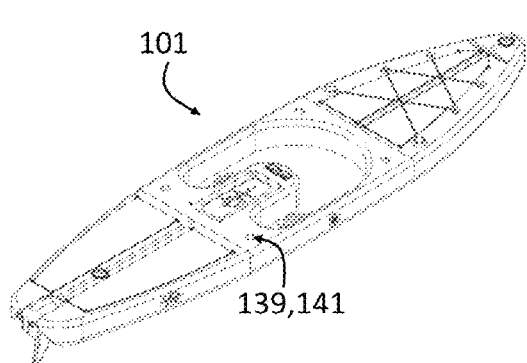
FIG. 22 depicts a top perspective view of a paddleboard assembly with removable lid removed.
Figure 23:
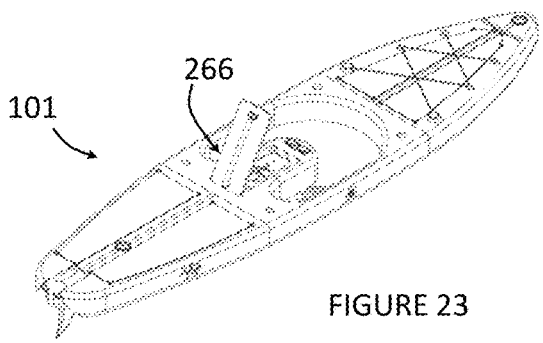
FIG. 23 depicts a top perspective view of a paddleboard assembly with removable lid partially installed.
Figure 25:
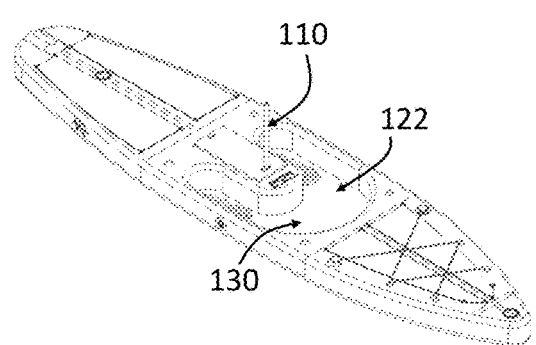
FIG. 25 depicts a top perspective view of a paddleboard assembly with flagpole upright.
Figure 24:
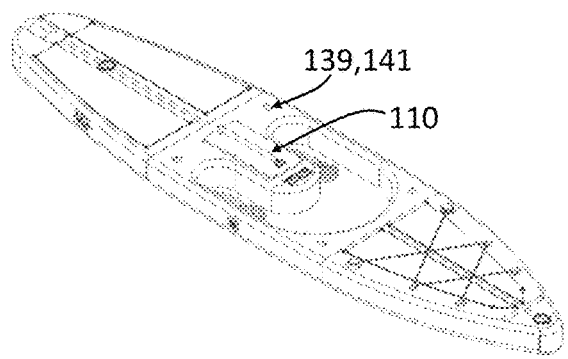
FIG. 24 depicts a top perspective view of a paddleboard assembly with flagpole folded down.

One or more solar panels, preferably removeable thin film type solar panels 168, can be coupled to the superior surface 217 of the inflatable bow 102 and the inflatable stern 104 as depicted in FIGS. 20-21. FIG. 19 depicts a paddleboard assembly 101 absent of solar panels on the superior surfaces, whereas FIG. 20 depicts a second stern solar panel 175 in place on the superior surface on the starboard side of the stern. FIG. 21 depicts a first bow solar panel 169 on the port side of the bow, a second bow solar panel 171 on the starboard side of the bow, a first stern solar panel 173 on the port side of the stern, and again the second stern solar panel 175 on the starboard side of the stern. Any one or more combinations of these individual solar panels can be utilized to supply solar energy to the MFSUP. FIG. 39 depicts electrical conductors that can be used to carry current from the solar panels to other elements of the MFSUP. For example, in this embodiment, the bow solar panels are electrically connected to bow solar conductors 260 that transition into a midsection conductor 264 that is electrically connected to the battery bank 274. The stern solar panels are electrically connected to stern solar conductors 262 which again ultimately terminate at battery bank 274. Energy collected from these solar panels are carried through these conductors to the battery bank 274 for charging the battery bank. In one embodiment, flexible solar panels are SOLAR TEC brand from VanStraten Industries in Baraga, Michigan. It should be noted, that a solar panel can also be secured to superior surfaces of midsection 106.

In preferred embodiments, the paddleboard assembly 101 included several attachment points. These attachment points can be used, for example: to tether to an anchor so the paddleboard assembly 101 doesn't float away if left unattended in a body of water, attaching carryon items to the paddleboard to avoid them being lost, and to tether to a user so the user and MFSUP don't become separated during use. In some embodiments, these attachment points are in the form of D-rings extending from D-ring receivers. The D-ring receivers can be in the form of a strip of PVC material sewed to a circle bit of material that is sewed to the superior surface. As noted in FIG. 2, the paddleboard assembly 101 comprises a stern D-ring 142 extending from a stern D-ring receiver 143 that is fixed or otherwise embedded in the superior surface 217 of inflatable stern 104. In this case, the stern D-ring is centered although other positions on the stern can be used. Similarly, a bow D-ring 144 extends from a bow D-ring receiver 145 that is fixed or otherwise embedded in the superior surface 217 of inflatable bow 102. The MFSUP can also include one or more midsection D-rings (mid D-rings) seated in a midsection D-ring receiver. The mid-section D-ring is most commonly used for securing an ankle leash to it. The D-rings can be manufactured from stainless steel. The D-rings can also be used to tie the MFSUP up to a dock, raft up with other vessels, tow behind another vessel, clip on a support handle when going fast and to secure carryon items.

The paddleboard assembly 101 can also include a restraint system 137 for securing carry-on items to the superior surface of the paddleboard assembly 101 and are functional whether the paddleboard is inflated or deflated. The restraint system 137 comprises an elastic cord 131 that zig zags across the superior surface of the inflatable bow 102 and/or the inflatable stern 104. In this embodiment, the elastic cord 131 extends from a bungee reel 132 to one or more hooks 136 having an integrated notch 138 that are spaced across the superior surface and terminates at a bungee lock 140. The bungee reel 132 can be seated in a bungee reel recess 134 disposed on the superior surface 217. This restraint system holds carry-ons items in place on the bow of the MFSUP. When deflated, the elastic cord 131 wraps around the folded board and attaches to the notches 138 in the hooks 136 for transport on land as illustrated in FIGS. 35-36.

Figure 31:
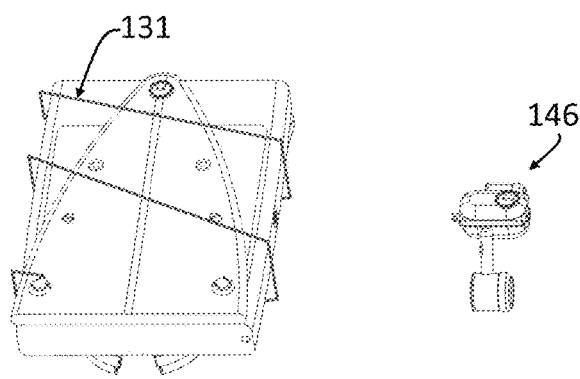
FIG. 31 depicts a perspective view of a paddleboard assembly with elastic cord from the restraint system binding the folded assembly together.
Figure 32:
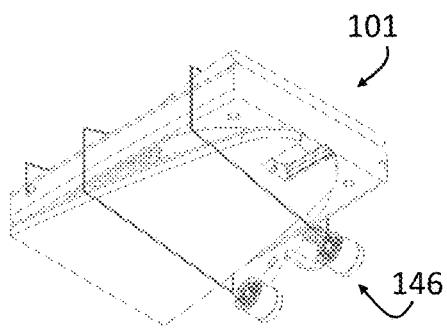
FIG. 32 depicts a perspective view of a paddleboard assembly with elastic cord from the restraint system binding the folded assembly together and drive unit secured by Halkey Roberts valve.
Figure 33:
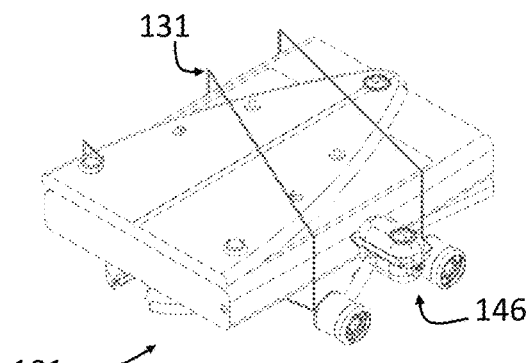
FIG. 33 depicts an opposing perspective view of the paddleboard assembly of FIG. 32.
Figure 34:
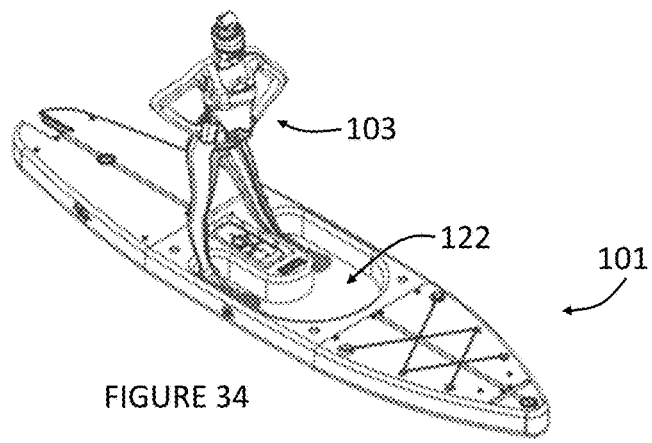
FIG. 34 depicts a top perspective view of a human standing within the standing platform of a paddleboard assembly. The paddleboard assembly is in an unfolded configuration.

FIGS. 28-33 demonstrates steps for folding of the paddleboard assembly. In an initial step, the drive unit 146 is removed and the air is evacuated from the inflatable bow 102 and inflatable stern 104. This can be done by opening the Halkey Roberts valve mate 247 to allow natural evacuation of air, or alternatively, using an evacuation pump. In some embodiments, the integrated air pump 151 within the drive unit will perform powered inflation or deflation. (Note: FIGS. 28-33 should not be interpreted to suggest portions of the inflatable bow and inflatable stern are partially removed from the midsection as they are bonded to the midsection). The inflatable bow 102 and inflatable stern 104 are then folded over against the midsection. The elastic cord 131 from the restraint system 137 is then wrapped around the folded paddleboard assembly 101 as depicted in FIG. 31. By using the mating parts of the Halkey Roberts valve, the drive unit 146 is mated to the folded paddleboard assembly 101 and is now ready for transport. FIGS. 35-36 depict various views of a human 103 transporting the folded and bound paddleboard assembly 101 with drive unit 146 mated to it. Here, it can be seen that the paddleboard assembly 101 and drive unit 146 can be lifted by the drive unit.

Integrated into the stern of the inflatable stern 104, is a docking port 150 for receiving a drive unit 146 therein (FIG. 9-10). The docking port is defined by a U-shaped dock wall 210 with a dock end face 212 on the dock wall facing the stern and a pair of spaced dock lateral faces 214 facing the middle of the docking port. Extending from each dock lateral face 214 is a base rail 161 positioned generally horizontally and protruding into the docking port. Extending into the base rails are a pair of opposing mounting grooves 167 that open to the stern and travel towards dock wall 210. The opposing mounting grooves are configured to receive and secure the drive unit 146 therebetween.

On the dock end face 212, is an inflator base 153 in the form of a coupling for mating with inflator nozzle 152 extending from drive unit 146. Also on the dock end face, is a charge base 148 for engaging with a charge mate 248 on the drive unit whereby current can flow from battery bank 274 to the drive unit 146. A magnet base 149 also on the dock end face 212, aligns with a magnet mate 249 on the drive unit 146 to magnetically secure the drive unit in place in the docking port. When the drive unit is docked in the docking port 150, this alignment, cooperation, and attraction between magnets and charge coils provides for magnetically charging of a battery pack 147 within the drive unit 146. More specifically, this is accomplished by a transmitting coil and drive loop embedded in the dual-layer PVC. In preferred embodiments, neodymium disc type magnets are utilized. A drive unit conductor 259 extends between the magnetic charge base along the inflatable stern 104, along the midsection 106 to battery bank 274.

Additional features of the drive unit 146 (FIG. 38) include an integrated battery pack 147 to provide power to the drive unit 146 when it is separated from the paddleboard assembly 101. In this embodiment, the battery pack 147 is in the form of a waterproof smart-lithium battery held in place by a battery bracket. In preferred embodiments, a Bluetooth receiver 193 is also be integrated in the drive unit 146. The Bluetooth receiver receives remote signals transmitted by a Bluetooth transmitter 192 integrated into control paddle 180 which sends control signals to control functions such as the propeller velocity on the drive unit. With this Bluetooth option, the drive unit can be controlled directly by interaction with controls on the drive unit, or by controls on the control paddle.

Figure 37:
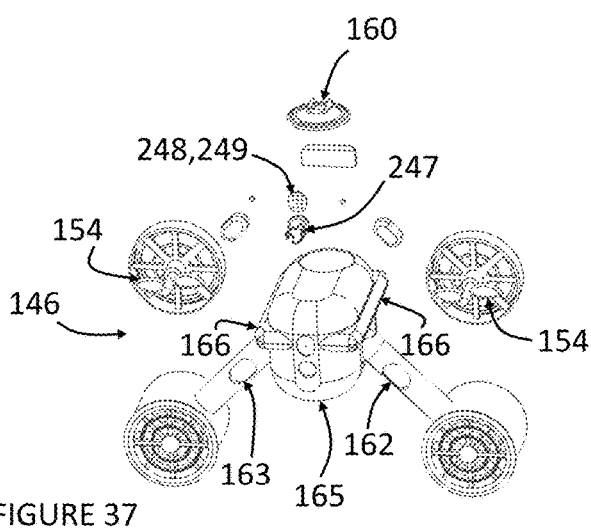
FIG. 37 depicts a partially exploded view of a drive unit.

Various types of drive units can be used, however, in this embodiment (FIG. 37, 38), the drive unit comprises a drive unit housing 165 which here is in the form of a hydrodynamic plastic encapsulating the drive unit and comprising integrated structural supports for mounting brackets 279 which provide for the attachment of accessories to the drive unit 146. Accessories can include for example, a GO-PRO or other camera for taking pictures or video, and a flashlight for providing light while paddleboarding or when using the dive unit independent of the paddleboard.

Sufficient air pockets may need inflating for positive buoyancy Within this housing is an integrated air pump 151 that produces air through an inflator nozzle 152 that is capable of inflating/deflating the inflatable bow and stern when mated to the lateral inflator port 240. On a superior facing face of the drive unit housing 165, is a motor D-ring 160 which can be used to tether the drive unit to the paddleboard assembly 101 when using the drive unit to dive below surface and thereby dragging the paddleboard assembly in tow. Disposed on opposed lateral sides of drive unit housing 165, is a mounting tongue 166 that extends at least partially from a bow end to stern end of the drive unit housing. The spaced mounting tongues 166 are configured to be received in a pair of spaced mounting grooves 167 within docking port 150 thereby securing the drive unit therein.

Extending from lateral sides of the drive unit is a first drive appendage 155 and a second drive appendage 157. These appendages include a handlebar 164 for grasping with a user's hand and terminates in a respective first propeller 154 and a second propeller 156. The first propeller 154 and second propeller 156 is encircled by a thrust vent 158 shielding the propeller from the user. On the handlebar of the first drive appendage is a first throttle trigger 162 whereas on the handlebar of the second drive appendage is a second throttle trigger 163. Depressing these triggers increases the velocity of the corresponding first and second propeller to advance the drive unit and user in water. When the drive unit is docked in the docking port 150 of the paddleboard assembly, the triggers propel the entire MFSUP and user.

FIGS. 8-12 illustrate a method for docking and undocking the drive unit 146 within docking port 150. As depicted in FIG. 8-10, the drive unit 146 is placed behind the docking port with the inflator nozzle 152 facing the stern of the paddleboard and aligning the mounting tongues 166 to be received in mounting grooves 167. The drive unit 146 is then advanced towards the stern such that the mounting tongues are captured and slide within the mounting grooves 167 (FIG. 11). The drive unit continues to be advanced as the inflator nozzle 152 is seated within the inflator base 153 that extends into the dock end face 212 so to allow the full contact between the opposed charging and magnetic members. Once fully advanced, the charge base 148 and magnet base 149 on the dock end face 212 will abut the respective charge mate 248 and magnet mate 249 located on the bow end of drive unit housing 165 (FIG. 12, 13). At this point, the drive unit is held within the docking port 150 by this magnetic attraction. In alternative embodiments, the mounting tongue (depicted here on the drive unit) and the mounting groove (depicted here within the docking port) are reversed. The function will be the same.

The method of removal (undocking) of the drive unit 146 from the docking port 150 comprises a reversal of the docking steps disclosed above. To initiate this, the user grasps the drive unit and pulls it in a direction opposite the bow with sufficient force to release the magnetic bond between the drive unit and magnet base 149. Continued pulling will result in full separation of the drive unit 146 from the docking port 150.

Figure 49:
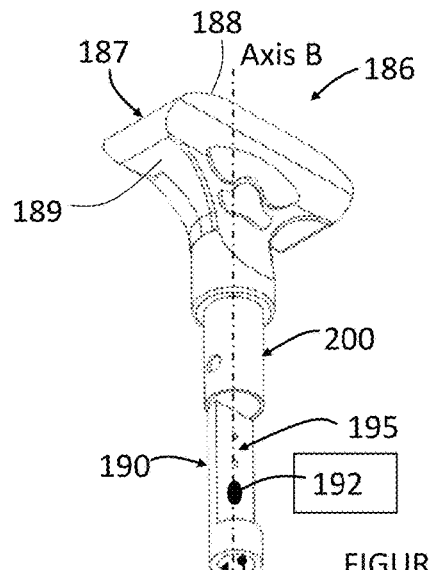
FIG. 49 depicts a side perspective view of a paddle handle of the control paddle of FIG. 45.

The paddleboard assembly can be propelled using a standard paddleboard paddle, however, in preferred embodiments, a control paddle 180 is used as illustrated in FIGS. 45-50. The control paddle can comprise a paddle fin 182 at a distal end that like typical paddles is generally thin when viewed from one direction yet has a broad tear-drop surface when turned 90 degrees. A paddle shaft 184 is secured to a thin end of the paddle fin. At a proximal end of the paddle shaft is a fixed or releasable paddle handle 186. The paddle handle comprises a handle body 187 which in this embodiment is T-shaped, although it can assume other profiles. At a proximal end of the handle body 187 is a convex shaped palm grip 188 contoured for seating into a user's hand. Opposite the palm grips are finger grips 189 for placement of the user's fingers when the handle body is seated in the user's palm for control of the paddle. Extending distally from the handle body 187 is a tubular shaped handle stem 200 defined by a cylindrical stem wall 201 with an inner stem surface 202 thereon defining a generally cylindrical inner stem cavity 203. The cylindrical stem wall 201 also has a generally cylindrical outer stem surface 204 thereon having an outer diameter sized for sliding fit into the shaft cannula 206 of the proximal end of paddle shaft 184. Extending transverse from the handle stem 200, are a pair of lock bosses 205 that are radially biased outward. At the proximal end of paddle shaft 184 is a retaining hole 207 extending perpendicular to the long axis of the paddle shaft. The paddle handle 186 is configured for releasable lock mating to the paddle shaft 184. This is done by aligning Axis A of the paddle shaft 184 with Axis B of the paddle handle 186, depressing the lock bosses 205 toward Axis B and sliding the handle stem 200 into shaft cannula 206 until the lock bosses align with and pop through the retaining holes 207. In some embodiments, the Bluetooth electronics are integrated in handle body 187, however as depicted in the embodiment of FIG. 49, a cylindrical shaped electronics housing 190 sized for fit within shaft cannula 206 is utilized. Inset into the electronics housing 190 is an electronics cavity 195 of size sufficient to contain the required electronics such as a printed circuit board which can be in the form of a Bluetooth transmitter 192 and in some embodiments a paddle battery. However, in this embodiment, a battery housing 191 is inset in a distal end of the electronics housing 190. A paddle battery 194 is housed within this battery housing 191 and connected to the Bluetooth transmitter using electrical conductors.

Figure 50:
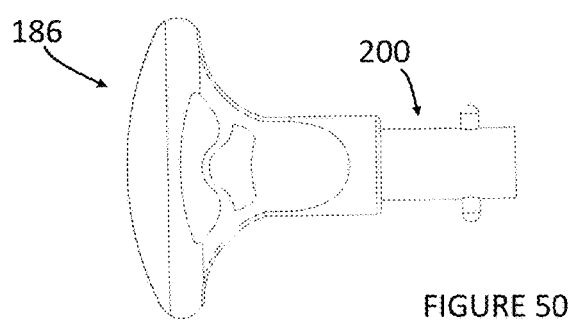
FIG. 50 depicts a side view of the paddle handle of the control paddle of FIG. 45.

Integrated into the handle body 187 are a plurality of control switches which through electrical conductors communicate with electronics in electronics cavity 195. This can include for example, a first control switch (button) 196, a second control switch 198, a third control switch 199, and a fourth control switch 197. The switches can be in the form of buttons and there can be a variety of configurations for the switches. FIG. 50 depicts one embodiment of button operations and the actions that depressing them activates.

When the drive unit 146 is removed from docking port 150, it can be substituted by fin insert 250. The fin insert comprises a fin base 252 that can assume a variety of shapes that are configured for fit within docking port 150. On lateral sides of fin base 252 are opposed horizontal elongate mounting tongues 166 replicating those described earlier on the drive unit. At a bow end of fin base 252 on a bow fin face 254, is once again a magnet mate 249 comprising magnetic material positioned for magnetic attraction with magnet base 149 on dock wall 210 thereby securing fin insert 250 within the docking port until manually removed. Extending inferiorly from fin base 252 is a fin 256 having the thinnest parts of the fin pointing towards the stern and the bow.

Figure 58:
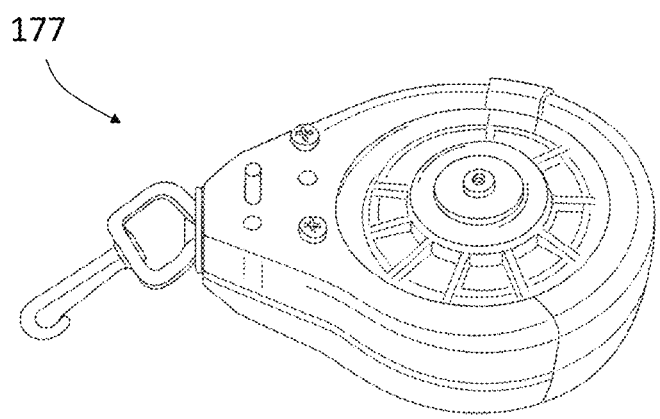
FIG. 58 depicts a top perspective view of a drive unit leash.

FIG. 58 depicts one embodiment of a drive unit leash 177. The drive unit leash has a retractable band with a secure locking switch. One end is attached to the drive unit such as at the D-ring. The carabineer on the end is clipped to any D-ring on the MFSUP. In some embodiments, the device is wrapped in a floatation aid.

Figure 59:
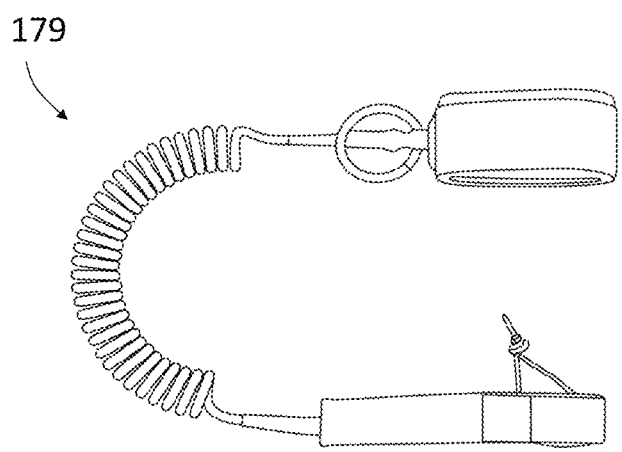
FIG. 59 depicts a top view of MFSUP leash.

FIG. 59 is a MFSUP leash 179. One end clips to a D-ring on the MFSUP, whereas the other end attaches to the user such as around their ankle.

It is noted that the terms "substantially" and "about" and "generally" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

The foregoing invention has been described in accordance with the relevant legal standards, thus the description is exemplary rather than limiting in nature. Variations and modifications to the disclosed embodiment may become apparent to those skilled in the art and fall within the scope of the invention.

The invention claimed is:
1. A multifunctional stand-up paddleboard comprising:
a paddleboard;
a drive unit;
said drive unit comprising a drive unit housing:
a pair of laterally spaced propellers;
said drive unit housing positioned between said propellers;
a pair of handlebars;
one handlebar positioned between each of said spaced propellers and said drive unit;
each handlebar comprising a throttle trigger to independently control said propellers;
a docking port;
said drive unit comprising at least one propeller operable in water;
said docking port inset at the stern in said paddleboard;
said drive unit removably secured in said docking port;

wherein in a docked mode said drive unit is seated in said docking port and operable to propel said paddleboard assembly; and wherein in an undocked mode said drive unit is removed from said docking port and operable to propel a human through a body of water.

2. The multifunctional stand-up paddleboard of claim 1 wherein said paddleboard further comprises:
an inflatable stern portion of said paddleboard;
a midsection of said paddleboard;
an inflatable bow portion of said paddleboard; and
wherein said midsection is rigid.

3. The multifunction stand-up paddleboard of claim 2 further comprising:
an inflatable skirt;
a starboard strap;
a port strap;
said inflatable skirt comprising said inflatable stern and said inflatable bow are joined by said starboard strap on a starboard side and by said port strap on a port side;
a central receiver port in the form of an open space between said inflatable bow and said inflatable stern and said starboard strap and said port strap; and
wherein said midsection is seated in said central receiver port.

4. The multifunction stand-up paddleboard of claim 2 further comprising:
a U-shaped standing platform;
said midsection having a superior surface; and
wherein said U-shaped standing platform is inset into said superior surface of said midsection.

5. The multifunction stand-up paddleboard of claim 2 further comprising:
a dry storage cavity;
wherein said dry storage cavity is inset in said rigid midsection.

6. The multifunction stand-up paddleboard of claim 2 further comprising:
a lateral inflator port;
an elongate inflator channel;
said elongate inflator channel extending between said inflatable bow and said inflatable stern; and
wherein introducing air into said lateral inflator port inflates both said inflatable bow and inflatable stern.

7. The multifunction stand-up paddleboard of claim 6 further comprising:
an integrated air pump;
said integrated air pump within said drive unit; and
wherein coupling said drive unit with said lateral inflator port is used to simultaneously inflate said inflatable stern and inflatable bow.

8. The multifunction stand-up paddleboard of claim 1 wherein an inflatable stern and an inflatable bow can be both inflated and deflated.

9. The multifunction stand-up paddleboard of claim 1 wherein said paddleboard bow, midsection, and stern are manufactured from a contiguous rigid material.

10. The multifunction stand-up paddleboard of claim 1 further comprising:
a mounting tongue;
a mounting groove; and
wherein said drive unit is docked and undocked from said docking port by a linear translation between said mounting tongue and said mounting groove.

11. The multifunction stand-up paddleboard of claim 1 further comprising:
a battery bank;
said battery bank operable to provide power to said paddleboard; and
wherein said battery bank is disposed on a rigid portion of said paddleboard.

12. The multifunction stand-up paddleboard of claim 11 further comprising:
a battery cavity;
said battery cavity disposed in a rigid portion of said paddleboard;
a removable lid; and
wherein said removeable lid covers said battery bank in said battery cavity.

13. The multifunction stand-up paddleboard of claim 1 wherein:
a fin insert is operable for releasable docking within said docking port in the absence of drive unit in said docking port; and
wherein said fin insert comprises a fin extending below said docking port when docked in said docking port.

14. The multifunction stand-up paddleboard of claim 1 further comprising:
a flag assembly;
said flag assembly comprising a flag;
said flag assembly movable between a deployed mode wherein said flag assembly is upright to serve as a signal to other boaters and an undeployed mode wherein said flag assembly is folded down generally out of view.

15. The multifunction stand-up paddleboard of claim 1 further comprising:
a superior surface facing upwards on said paddleboard;
an electrical conductor;
a battery bank;
said battery bank disposed on a rigid portion of said paddleboard;
at least one solar panel disposed on said superior surface of said paddleboard; and
an electrical conductor operable to conduct electrical energy from said solar panel to said battery bank.

16. The multifunction stand-up paddleboard of claim 1 further comprising:
a paddle;
said paddle having a paddle handle;
said paddle comprising at least one control switch;
said paddle comprising a Bluetooth transmitter;
a Bluetooth receiver;
said drive unit comprising said Bluetooth receiver;
wherein activation of said at least one control switch on said paddle causes a signal to be transmitted from said Bluetooth transmitter to said Bluetooth receiver causing consequent activation of said at least one propeller.

17. The multifunction stand-up paddleboard of claim 16 further comprising:
a second control switch;
wherein depressing said second control switch causes consequent switching of power to said drive unit between off and on.

18. The multifunction stand-up paddleboard of claim 1 wherein an inflatable bow and an inflatable stern are deflated and folded adjacent to a midsection in a folded configuration.

19. The multifunction stand-up paddleboard of claim 1 further comprising:
a plurality of D-rings;
said paddleboard comprising a superior surface facing upwards; and wherein said D-rings are coupled with said superior surface and operable for tying tethers to said D-rings.

20. The multifunction stand-up paddleboard of claim 1 further comprising:
an inflator nozzle;
said inflator nozzle extending from said drive unit housing;
a rigid midsection of said paddleboard;
a lateral inflator port located on a lateral side of said rigid midsection;
said inflator nozzle and said lateral inflator port are in the form of a Halkey Roberts valve; and
wherein said Halkey Roberts valve secures said drive unit to said paddleboard when said multifunction stand-up paddleboard is carried by a handlebar.

21. The multifunction stand-up paddleboard of claim 1 further comprising:
a restraint system;
said restraint system comprising an elastic cord;
said elastic cord weaving across said inflatable bow in an inflated state;
said elastic cord repositioned to encircle said paddle board in a folded configuration; and
wherein when in said folded configuration said elastic cord is grasped by a user to assist in transporting the device.

* * * * *